UNITED STATES PATENT OFFICE.

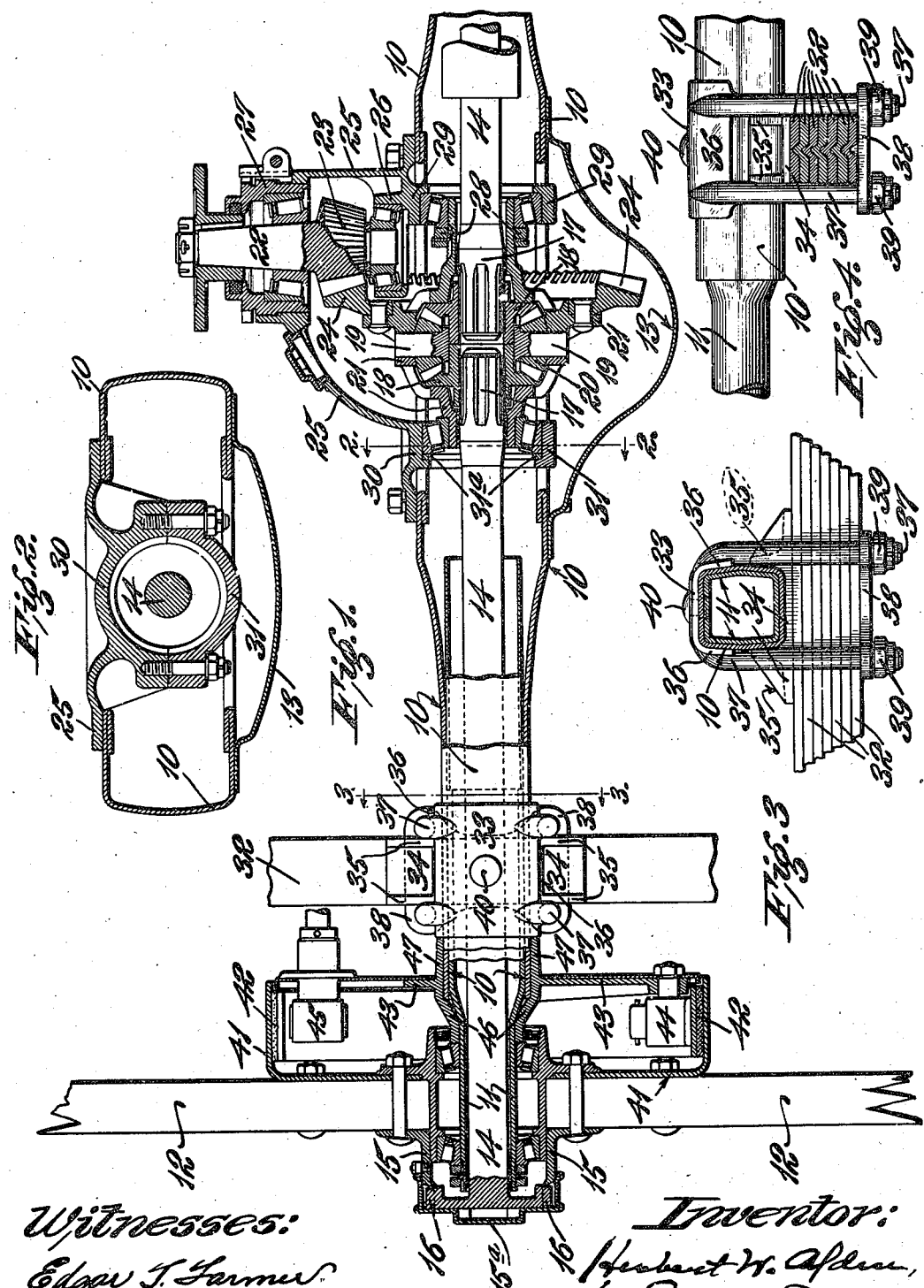

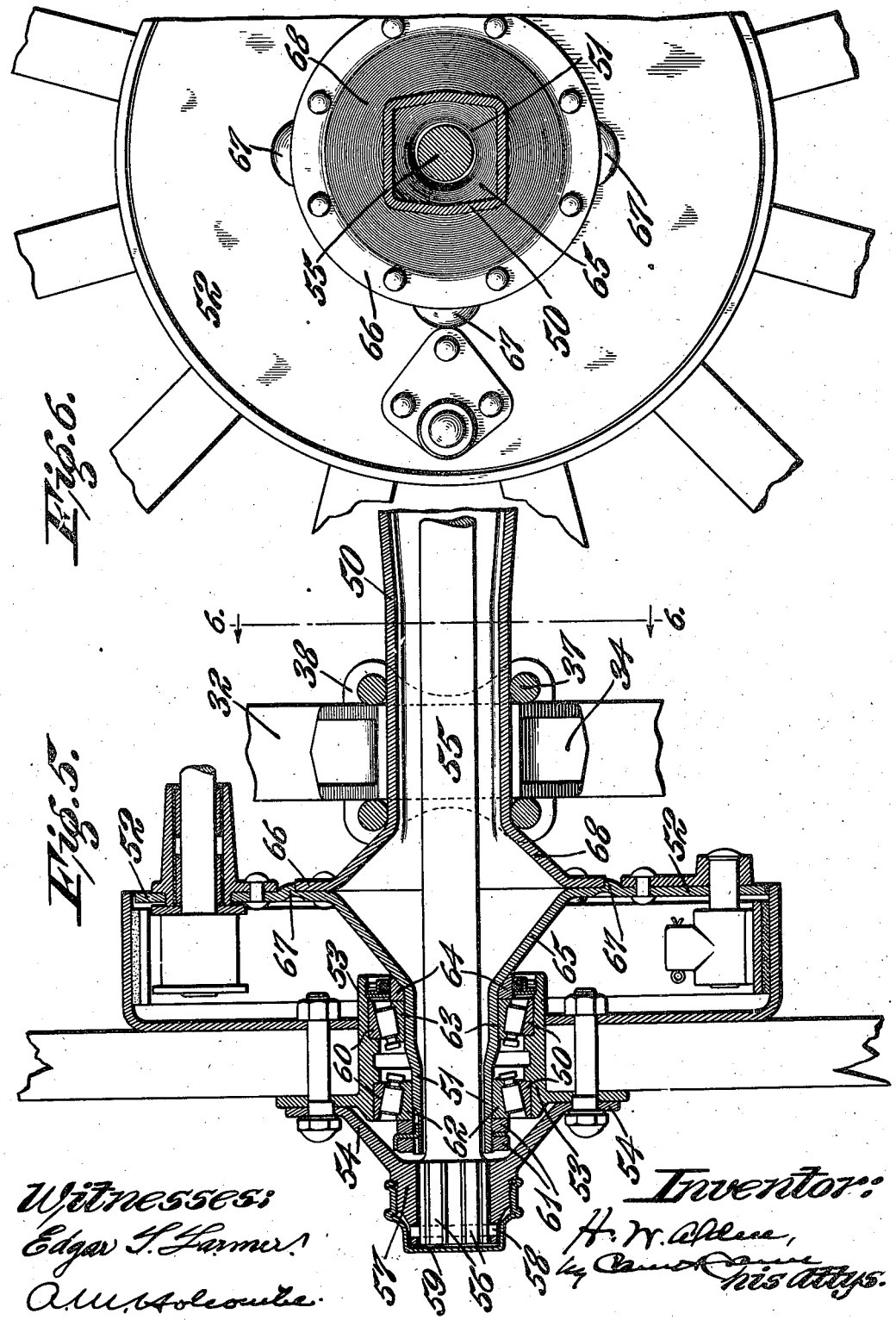

HERBERT W. ALDEN, OF DETROIT, MICHIGAN, ASSIGNOR TO THE TIMKEN-DETROIT AXLE COMPANY, OF DETROIT, MICHIGAN, A CORPORATION OF OHIO.

MOTOR-VEHICLE AXLE.

1,188,601.  Specification of Letters Patent.  Patented June 27, 1916.

Application filed February 1, 1915. Serial No. 5,398.

*To all whom it may concern:*

Be it known that I, HERBERT W. ALDEN, a citizen of the United States, and a resident of the city of Detroit, county of Wayne, and State of Michigan, have invented a new and useful Improvement in Motor-Vehicle Axles, of which the following is a specification.

This invention relates to hollow driving axles for gear driven motor vehicles, and particularly to the form and arrangement of the driving parts and their mounting, and to a casing therefor which is suitable for axles which have no torque rod, radius rod or similar device to resist the driving and braking torque.

One of the objects of this invention is a simple and compact arrangement of the driving and braking parts in connection with a hollow axle casing, such that the number of parts required is few, the weight of the axle is small and its center of gravity is close to its principal axis, and the rotative effect of the driving and braking torque is opposed by the propelling effort and drag of the wheels, whereby the need for torque rods is reduced.

Another object of the invention is a hollow axle having few parts, which is both strong and light, and to which the spring mountings can be clamped or otherwise secured without rivets or brazed joints, whereby the springs cannot slip or turn and are adapted to carry the stresses usually carried by torque rods.

Further objects of the invention appear hereinafter.

The invention consists in housing the driving parts in a hollow axle casing which is non-circular in form, and which is adapted to receive removable carrier frames which carry the driving and braking devices.

The invention also consists in the form and arrangement of the spindle ends for the hub bearings, and the connection between them and the middle casing member of the hollow axle.

The invention also consists in a spring hanger or saddle mounted on the axle casing and conforming to the shape of the portion of the axle which it surrounds or straddles, whereby rotation of the spring around the hollow axle is prevented.

The invention further consists in the forms and arrangements of parts shown in the accompanying drawings, which illustrate two embodiments of the invention.

In the drawings, in which the same reference characters designate like parts in the several views, Figure 1 is a part plan view and part horizontal section of a portion of an axle embodying the invention; Fig. 2 is a vertical cross-section of the casing, carrier frame and pedestal, on the line 2—2 of Fig. 1, looking in the direction of the arrows; Fig. 3 is a cross-section on the line 3—3 in Fig. 1, looking in the direction of the arrows, the saddle and spring being shown in side view; Fig. 4 is a side view of a portion of the axle shown in Fig. 1, showing the spring saddle with a spring mounted thereon, the spring being shown in cross-section; Fig. 5 is a horizontal section of the end portion of another axle embodying the invention; and Fig. 6 is a vertical cross-section of the same, on the line 6—6 in Fig. 5, looking in the direction of the arrows, the spring and spring hanger being removed.

The driving axle shown in Figs. 1 to 4 of the drawings includes a substantially rectangular axle casing or housing 10, which has cylindrical tubular extensions 11 at its ends upon which the road wheels 12 are journaled. The hollow axle casing 10 is enlarged at the middle to form a chamber for the bevel driving gears and differential gear, to which access may be had through an opening in the side of the casing which is closed by a removable cover 13. The driving shaft sections 14 for driving the road wheels of the vehicle are arranged in the tubular ends of the axle, and are withdrawable endwise therefrom. The hubs 15 of the road whels overhang the outer ends of the axle extensions 11, and are provided with slots in which fit radial teeth 16 on the outer ends of the driving shaft sections 14. The driving shaft sections are held in place in the axle by the hub caps 15ª, which screw on the hubs over the outer ends of the driving axle sections. The inner ends 17 of the driving shaft sections are slidably engaged in the hubs of the two oppositely disposed bevel gears 18 of the differential gear. The bevel gears 18 are journaled in the spider 19 which carries the small bevel pinions 20 of the differential gear, all of which parts are mounted in the differential gear drum 21.

The differential gear drum is rotated from the propeller shaft 22 by means of a bevel pinion 23 on the propeller shaft which meshes with a bevel gear 24 secured to a flange which encircles the drum. The bearings for the propeller shaft are mounted in a gear carrier 25 which is bolted to one side of the axle casing, and the hubs of the differential gear drum are journaled in two pedestals 29, 30 which project from the gear carrier 25 into the axle housing in axial alinement with the wheel hubs. Tapered roller bearings of an adjustable type are used for mounting both the propeller shaft and the differential drum. The bearing on the small end of the propeller shaft is mounted in a solid pedestal 26 which is an integral part of the gear carrier, and the opposite bearing is mounted in an adjustable sleeve 27 which screws into the gear carrier to take up the wear in the propeller shaft bearings, and which can be locked in adjusted position by a clamping bolt and detent. The bearing on the hub of the differential drum next to the large bevel driving gear is adjustable lengthwise on the hub to take up wear in the bearings for the drum by means of an adjusting ring 28, which may be locked in adjusted position by a lock washer and nut. The other bearing for the differential drum is not adjustable on the hub. The pedestal 29 on the side of the differential gear drum next to the large bevel driving gear is solid. The opposite pedestal 30 is split on a vertical plane and provided with a cap 31, and a spacing washer 31ª is inserted between the pedestal 30 and the cup of the bearing arranged therein in order to permit of the assembling of the drum and bearings in the carrier 25.

No provision is made for holding the axle from rotating other than the springs, which must resist the axle casing torque, or forces tending to rotate the axle casing produced by the driving and braking devices. Heretofore, tubular driving axles have been circular in form at the spring seats and in case no torque rod was provided it has been necessary to braze or rivet the spring saddles or supports to the axle tube in order to prevent them from rotating thereon, which rotation would permit the axle casing to rotate relatively to the springs and disarrange the driving and braking devices.

According to this invention, the axle tube 11 is non-circular in the shape of its periphery near its ends; and preferably it is of approximately square shape, having flat top and bottom walls, and having side walls which have a slight outward slant from the upper and lower corners to the middle horizontal plane of the axle. The springs 32 preferably are suspended below the axle by means of a U-shaped hanger 33, as shown in the drawings; but the parts may be reversed, and the spring arranged above the axle. The suspended spring arrangement is preferred because the twisting effect of the propelling effort and of the drag due to braking is thereby reduced if not eliminated. In either case, the spring is seated against a saddle 34, which has two lugs or arms 35 embracing the adjacent portions of the side walls of the axle and slanting outward to conform thereto. The side walls 36 of the hanger also slant outward to conform to the slant of the adjacent portions of the side walls of the axle. The hanger bolts 37, four in number, depend from the side walls 36 of the hanger near its ends on both sides of the axle, and embrace the spring and saddle between them. The spring rests on a plate 38, having holes in its four corners through which the hanger bolts pass, and the parts are all tightly clamped together by screwing up the nuts 39 hard against the under side of the plate. Suitable means is provided for locking the nuts in place. A stud 40, which is riveted or otherwise secured to the hanger, fits in a hole in the top wall of the axle and positions the parts lengthwise of the axle.

The road wheels 12 are each provided with a brake drum 41 which is secured on the inside of the spokes, and which is adapted to be engaged by a friction band 42 arranged therein. The brake band 42 is supported by means of a spider 43 secured on the end of the axle casing 10, and is held from rotating with the wheel by means of an anchor arm 44 carried by the spider. The shaft for the brake actuating cam 45 is also supported by the spider. The spider has an inner hub 46 which conforms to the square shape of the axle casing 10 and fits snugly over it, and an outer hub 47 which conforms to the round shape of the axle extension 11 and fits snugly over it, the spider being pressed into place and held there by the wheel bearing.

The driving axle shown in Figs. 5 and 6 is similar in the arrangement of the driving parts to that shown in Figs. 1 to 4. In the structure shown in Figs. 5 and 6 the hollow axle bridge, or load sustaining member, consisting of the casing 50 and spindle ends 51, is made of pressed steel throughout. The casing section 50 is made of pressed steel upper and lower halves, welded together along the horizontal median plane, as shown and described in my Patent No. 1,108,114. The brake spider 52 is integral with the axle spindle 51 and forms a dust shield for the inner end of the wheel hub 53. A driving plate 54 is bolted to the outer end of the wheel hub, and the outer end of the driving shaft section 55 passes through the middle of the driving plate and has a loose driving connection therewith by means of splines 56 formed on the shaft which fit in axial grooves in the driving plate hub 57. A pin 58 holds the driving shaft in position lengthwise of the driving hub 57, and a hub cap 59 screws over the hub 57 and covers the end of the driving shaft and holds the pin 58 in place.

The wheel hub 53 is journaled on two rings of conical roller bearings 60, the cones or inner race members of which are mounted on the axle spindle 51. The extremity of the axle spindle is threaded, and adjusting nuts 61 are screwed on it to hold the outer bearing cone 62 in place. The inner bearing cone 63 abuts against a collar 64 on the axle spindle, which in turn abuts against the flaring conical wall 65 which connects the spindle end 51 with the dust shield portion 52. Around the base of the flaring conical wall 65, where it merges into the dust shield 52, is a flat annular portion which contacts flatwise with an annular circumferential flange 66 on the end of the axle casing 50, and is securely riveted or welded thereto. Lugs or projections 67 on the dust shield position the flange 66 concentrically with respect to the spindle end. The outer end of the axle casing is flared outward in the form of a cone 68 to meet the flange 66. The wall of the cone runs down on the sides of the square axle casing in the middle of each side, and the corners of the square axle casing run up on the wall of the cone, thereby causing an overlapping of the two portions at their junction and forming a gradual transition from one shape to the other which has no one point which is appreciably weaker than the points on each side of it. The spring saddle 34, clamping bolts 37 and clamping plate 38 for the spring 32 are similar to those described for the axle shown in Figs. 1 to 4. This arrangement does not require that any holes be made in the axle casing, and so the full cross-sectional area of the steel is available to support the weight on the axle and the driving and braking torque, the bending and twisting stresses which are produced thereby being at their maximum at the spring support.

Among the advantages of the foregoing constructions are the following: First, there are fewer parts than in prior constructions embodying hollow axles, the parts can be lighter for the same strength by reason of their form, and they can be easily assembled and removed as need be. Second, the form and arrangement of the parts are such that they can be manufactured with precision and assembled with accuracy, and the adjustments are few and easy to make. Third, the parts are compactly arranged in such manner as to lessen the moment of forces acting in couples to produce rotation or twisting, and thereby rigidity and silent operation are promoted. Fourth, the square section hollow axle is stronger than a round section axle of the same cross-sectional area, and the square shape of the hollow axle permits the use of a simple clamp hanger for supporting the spring whereby the driving and braking torque can be transmitted to the spring saddle and spring without brazed or riveted connections. Fifth, the outwardly slanting side walls of the axle can bend sidewise, either out or in, sufficiently to accommodate themselves to the shape of the hanger and saddle when the parts are clamped in place, thus insuring a good fit without accurately finishing the axle ends on the outside; and with the parts tightly clamped in place, the side walls of the axle cannot bend sidewise, either in or out, even under heavy side pressure or under torque resulting from a sudden hard application of the brakes. Sixth, in the construction shown in Figs. 5 and 6, the conical walls connecting the end flanges and the square middle section of the hollow axle casing strengthen the axle where axles often break, and the cone and square overlap for a short space where they merge, thereby stiffening the junction and largely preventing localization of bending stresses at the junction. Seventh, the one piece brake spider, dust shield, and spindle construction of pressed steel does away with all castings or forgings in the load sustaining members of the axle; and also enables the manufacturing cost of the axle to be reduced by decreasing the amount of machine work and accuracy of fit required for properly assembling the spindle and brake parts.

The invention is not restricted to the precise forms and arrangements of parts shown in the drawing.

I claim the following as my invention:

1. A driving axle for motor vehicles comprising a middle casing section adapted to receive driving gearing, said middle section being of rectangular shape throughout its length with conical flaring ends, and hollow end sections secured to said middle section, each of said end sections having a cylindrical portion adapted to receive journal bearings and an annular flange at its inner end, and said axle having annular flanges at the extremities of said flaring end portions secured flatwise to the annular flanges of said end sections.

2. A driving axle for motor vehicles comprising a middle casing section adapted to receive driving gearing and having square tubular ends, and hollow end sections secured thereto, each of said end sections having a cylindrical portion adapted to receive journal bearings, and an annular flange at its inner end, and said axle having annular flanges at its ends secured flatwise to the annular flanges of said end sections and conical walls connecting the end flanges of said axle with the square tubular ends, said conical walls and square ends intersecting each other at an angle whereby portions of their meeting edges lap.

3. In combination, in a driving axle for motor vehicles, a hollow axle tube of non-cylindrical form, driving axle sections arranged therein, means for rotating said driving axle sections, said means producing a reaction on said hollow axle tube, a spring saddle having lugs projecting from one side, said lugs conforming to and embracing the side walls of said axle tube, a spring, and means for clamping said saddle and spring on said axle tube, whereby said reaction due to the driving torque is transmitted to said spring.

4. A spring support for motor vehicles comprising a hollow axle of non-cylindrical shape, a saddle having a seat for the spring, and spaced lugs projecting from the saddle on the side opposite the spring and embracing said axle, a spring seated against said saddle, a clamping plate for said spring, and a hanger embracing the axle opposite said saddle, said hanger having portions straddling said saddle and spring and engaging said spring supporting plate, and means for clamping said parts together upon said axle whereby said axle and spring are prevented from relative rotation.

5. A hollow axle tube which is substantially square on its exterior, the side walls slanting outward from the top and bottom toward the middle horizontal plane of the axle, a spring saddle having lugs projecting from one side and conforming to the slant of said side walls, and means for clamping said saddle on said axle tube.

6. A hollow axle tube having a non-cylindrical exterior comprising thin top, bottom and side walls, said side walls having an outward bulging form, a spring saddle having lugs projecting from one side, said lugs embracing said axle tube and conforming to the shape of the side walls thereof, and means for clamping said saddle on said axle tube whereby the walls thereof are stiffened.

Signed at Detroit, Mich., this 28th day of January, 1915.

HERBERT W. ALDEN.

Witnesses:
ALBERT E. PETTIT,
LESLIE WILLIAMS.